Figure 1:
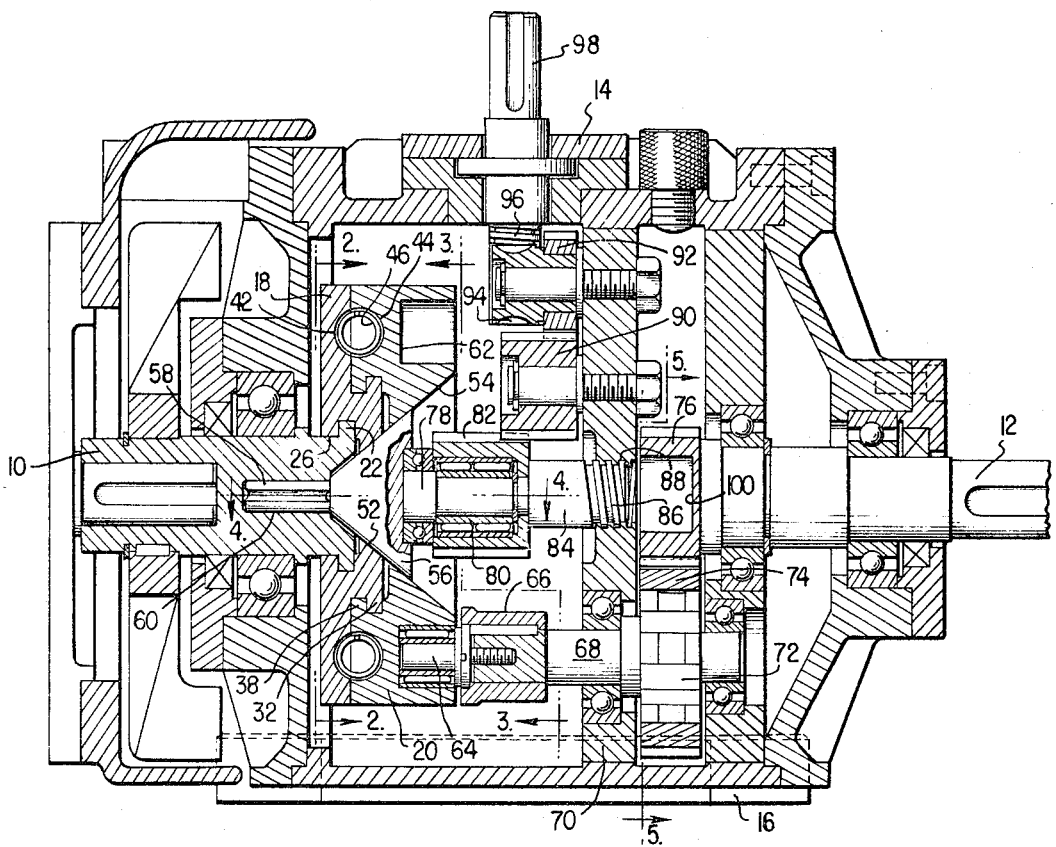

Jan. 21, 1969

J. B. MENDEZ ET AL 3,422,690

VARIABLE SPEED MECHANISM

Filed June 20, 1966

INVENTORS.
JOSE BLANCO MENDEZ
JULIA BLANCO MENDEZ
BY

ATTORNEYS.

INVENTORS.
JOSE BLANCO MENDEZ
JULIA BLANCO MENDEZ

BY

ATTORNEYS.

United States Patent Office 3,422,690
Patented Jan. 21, 1969

3,422,690
VARIABLE SPEED MECHANISM
Jose Blanco Mendez and Julia Blanco Mendez, both of Travesera de las Corts 138 y C/. Galileo 261, Barcelona, Spain
Filed June 20, 1966, Ser. No. 558,667
Claims priority, application Spain, June 24, 1965, 314,600
U.S. Cl. 74—117          5 Claims
Int. Cl. F16h 29/12

This invention relates to speed variation mechanism and more particularly to mechanism for converting constant rotary movement to oscillatory or intermittent rotary movement.

Briefly, according to the present invention, a pair of discs are mounted on a shaft adapted to be driven at constant speed, said discs being connected with said shaft for rotation therewith but being movable transversely thereof into offset relation. Means are provided for selectively offsetting the discs relative to each other but centered relative to the shaft so that the discs counterbalance each other during rotation. One of the discs is provided with annular cam means which is eccentric to the shaft when the discs are offset, and a follower engages the cam means and is carried by a crank arm mounted on a crankshaft so that movement of the follower causes oscillation of the crankshaft. A one-way clutch may be driven by the crankshaft to convert the oscillatory movement to intermittent rotary movement.

Figure 2:
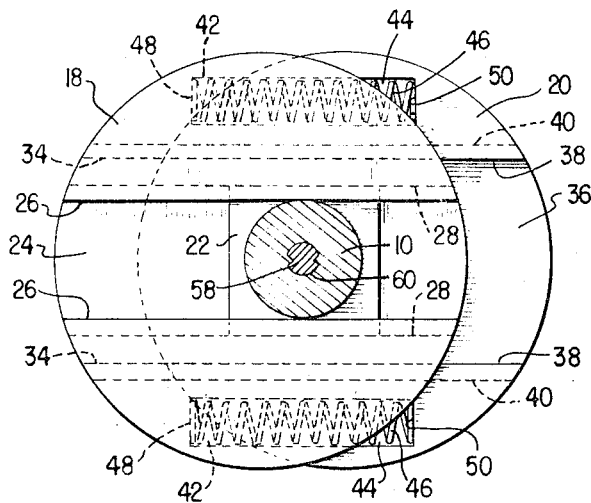
Figure 3:
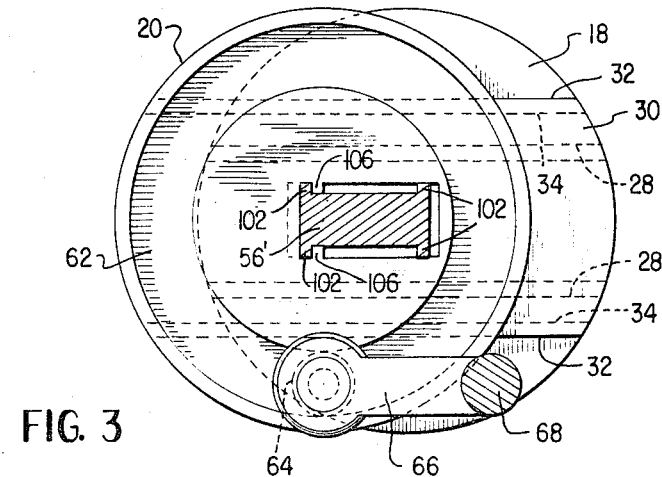
Figure 4:
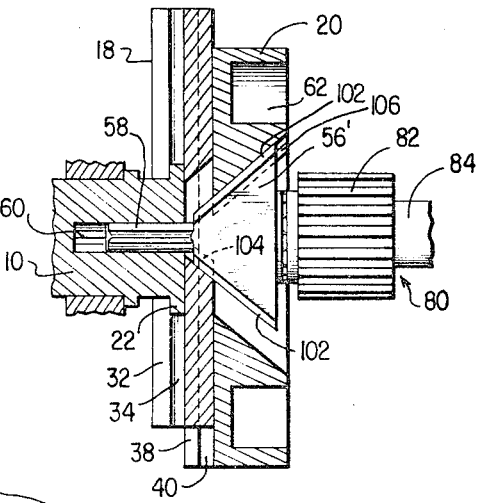
Figure 5:
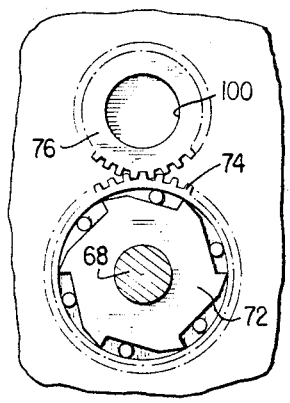

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a cross-sectional view of a mechanism in accordance with the present invention, and FIGS. 2 through 5 are cross-sectional views taken on lines 2—2; 3—3; 4—4 and 5—5, respectively of FIG. 1, FIGS. 3 and 4 showing a modification of the control member.

Referring now in detail to the drawings, specifically to FIG. 1, the present invention comprises a drive shaft 10 that may be constantly driven by any suitable power source, and a driven shaft 12 that is oscillated or driven intermittently from the drive shaft 10, as will be described hereinafter, both shafts being journaled in a housing 14 having support means 16. The invention resides in the mechanism within the housing 14 that is driven by the shaft 10 and which, in turn, oscillates or intermittently drives the shaft 12.

A first disc 18 is mounted on the shaft 10 for rotation therewith but for movement transversely thereof, and a second disc 20 is mounted on said first disc for rotation therewith but for movement transversely thereof. As better shown in FIG. 2, the shaft 10 is provided with a flat sided flange 22 and the disc 18 is provided with a diametrically disposed slot 24 for receiving the shaft 10, and the parallel side walls 26 of the slot are each provided with a groove 28 for respectively receiving diametrically opposed portions of the flange 22.

On its opposite side or face, as better shown in FIG. 3, the disc 18 has a diametrically disposed projection 30 having parallel side walls 32 each of which is provided with a groove 34. The side walls 32 are parallel with the slot side walls 26. The disc 20, as better shown in FIG. 2, is provided with a diametrically disposed slot 36 whose side walls 38 are provided with grooves 40. The portions of the side walls 32 and 38 which overhang their respective grooves constitute tongues for nesting respectively in the grooves 40 and 34 whereby the discs 18 and 20 are keyed together rotatively but are transversely slidable relative to each other.

In their abutting faces, the discs 18 and 20 are each provided respectively with a pair of matching grooves 42 and 44 respectively for cooperatively receiving one of a pair of coil springs 46. The grooves 42 and 44 are parallel with the tongues 32, 38 and grooves 40, 34 so that the springs 46 tend to bias the two discs apart transversely of the axis of shaft 10. The grooves 42 and 44 each are closed at their respectively opposite ends to provide abutments for the springs 46, but the other ends of said grooves open through the edges of the discs to accommodate the springs when the discs are offset.

The discs 18, 20 are provided with axially disposed conical or wedge shaped apertures 52 and 54, respectively, which, when coaxial, define a single cone or wedge shaped socket tapering outwardly from the inner end of the drive shaft 10. These apertures 52, 54 receive a conical or wedge shaped control member 56 (FIG. 1) or 56' (FIGS. 3 and 4) which is disposed axially of the drive shaft 10 and is axially movable relative thereto to regulate the offsetting of the discs 18, 20 relative to each other and to center them relative to the drive shaft so that the discs counterbalance each other. The control member 56, 56' may be provided, particularly if it is conical, with an axially disposed protruding splined shaft 58 which slidably fits in an axial splined bore 60 in shaft 10.

The disc 20 is provided, in its face opposite the disc 18, with an annular groove 62 within which is fitted a follower 64 carried by a crank arm 66 mounted on one end of a shaft 68 that is journaled in a partition 70 within the housing 14. The other end of the shaft 68 is connected to a gear 74 and, depending upon the type of drive desired, this connection may be by a one-way clutch 72. In this latter event, the shaft 68 is fixed to the drive portion of the one-way clutch 72, the driven portion of which is constituted by the internal surface of the externally toothed ring gear 74. The latter gear is in mesh with a spur gear 76 that is fixed to the inner end of the driven shaft 12. Thus, the shaft 12 will be driven intermittently through the one-way clutch 72 depending upon the throw of the crank arm 66 in accordance with the eccentricity of the disc 20 and its annular groove 62.

The eccentricity of the disc 20 is regulated by the axial disposition of the control member 56, 56'. This member has a shaft portion 78 extending axially from its enlarged end, and which is rotatively mounted in a carrier 80 which includes a concentric gear portion 82 and an axially disposed shaft 84, the end portion 86 of which is externally threaded and engages within an internally threaded bore 88 within the partition 70. The gear portion 82 meshes with a gear 90 which, in turn, is in mesh with a spur gear 92 that is fixed axially with a worm gear 94 that is in mesh with a worm 96 fixed on a control shaft 98.

As previously stated, the apertures 52, 54 and control member 56, 56' may be conical in configuration as shown in FIG. 1, or they may be wedge shaped and of rectangular section, as shown in FIGS. 3 and 4. The splined shaft 58 not only serves to drive the member 56, to avoid possible friction if the member is conical, but also, in combination with the threaded shaft portion 86, serves to support the combined control member 56-carrier 80 assembly. As the gear 76 on the driven shaft 12 may be axially aligned with shaft 84, such gear may be provided with a cavity 100 for accommodating the end of the threaded portion 86 when the latter is threaded completely through the bore 88.

If the apertures 52, 54 and control member 56' are wedge shaped, the control member may have outwardly extending flanges 102 along two opposite sides and the discs may have flanges 104, 106 extending inwardly within their apertures along respectively opposite sides only to form grooves for nesting the flanges 102. With this structure, the shaft 58 need not be splined and the springs 46 can be omitted because the nested flanges 102 move the discs in both directions.

In operation, a power source is connected with the shaft 10 to drive the shaft at a constant speed. Obviously, if the discs 18 and 20 are concentric with the shaft 10, the groove 62 is also concentric so that no motion is imparted to the follower 64. To impart motion, the control member 56, 56' is adjusted to offset the discs 18 and 20 relative to each other and to the shaft 10 while maintaining the offset discs centered with respect to the shaft. As the control member 56 is retracted from the shaft 10, the discs 18 and 20 are offset by the springs 46 in which event the control member merely serves to limit the relative offset of the discs. Conversely, if a wedge shaped control member 56' is provided with flanges 102 to cooperate with flanges 104, 106 of the discs, then the control member serves to positively move the discs as well as limit their movement.

The relative positioning of the control member 56, 56' is readily effected by operation of the control shaft 98 to turn the worm 96 in the selected direction. The worm in turn drives the worm gear 94 which turns the gear 92 which drives the gear 90 and which in turn drives the gear 82 to rotate the shaft 84 and move said shaft axially by cooperation of the threaded portion 86 with the threaded bore 88. When the discs are selectively offset, the annular groove 62 will then be eccentric to the shaft 10 so that the follower 64 will be reciprocated to swing the crank arm 66 and oscillate the crankshaft 68. This in turn will oscillate the gear 74 if the crankshaft is directly connected thereto or intermittently drive the gear 74 if the one-way clutch 72 is interposed between the crankshaft and such gear. The gear 74 in turn will drive the gear 76 which is fixed to the driven shaft 12.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. Speed variation mechanism comprising a drive shaft to be driven at a constant speed, a pair of discs mounted on and keyed to said drive shaft for rotation therewith but being transversely movable relative to said shaft and to each other, means for moving said discs relative to each other but centered relative to said shaft so that said discs counterbalance each other during rotation with said shaft, one of said discs having annular cam means which is eccentric to the axis of said shaft when said discs are offset relative thereto and to each other, and crank means including crank arm mounted on a crankshaft and carrying a follower engaged with said cam means whereby said crankshaft is oscillated by said cam means when the latter is eccentrically disposed relative to said drive shaft, one of said discs being mounted on the end of said drive shaft by interfitting first tongue and groove means permitting slideable movement of said disc transversely of said shaft between concentric and offset positions, the other of said discs being mounted on said one disc by interfitting second tongue and groove means that is parallel with said first tongue and groove means and permitting slidable movement of said other disc relative to said one disc between concentric and offset positions, said discs each having an axially disposed tapered aperture therethrough which jointly define a socket tapering outwardly from the end of said drive when said discs are concentric, and said means for moving said discs comprises a tapered control member mounted coaxially of and axially movable relative to said shaft within said tapered apertures to control the offset relation of said disc and center them relative to said shaft.

2. Speed variation mechanism according to claim 1 comprising a carrier disposed axially of said drive shaft and rotatively supporting said control member, a fixed support having an internally threaded bore, said carrier including a threaded shaft portion threaded in said bore, and means for rotating said shaft portion for moving said control member within said tapered apertures for selectively varying the relative offset of said discs.

3. Speed variation mechanism according to claim 1 wherein said means for moving said discs also comprises spring means engaged between said discs and urging them into offset relation with said tapered control member limiting the offset movement of said discs.

4. Speed variation mechanism according to claim 1 wherein the tapered apertures in said discs and said tapered control member are rectangular in section, said control member having flanges along opposite sides, and said discs having grooves for receiving said flanges along one side of said tapered openings, said grooves being disposed on opposite sides of the respective discs, whereby movement of said control member positively moves said discs.

5. Speed variation mechanism according to claim 1 comprising means drivingly connecting said control member with said drive shaft.

References Cited

UNITED STATES PATENTS

| 370,705 | 9/1887 | Koch | 74—116 |
| 454,658 | 6/1891 | Nutting | 74—117 |

FRED C. MATTERN, Jr., *Primary Examiner.*

WESLEY S. RATLIFF, *Assistant Examiner.*